United States Patent
Goto et al.

(10) Patent No.: US 6,564,266 B1
(45) Date of Patent: May 13, 2003

(54) EXCHANGE CONNECTABLE TO LAN

(75) Inventors: Mamoru Goto, Tokyo (JP); Takeshi Uehara, Tokyo (JP); Masahiko Shoji, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/334,989

(22) Filed: Jun. 17, 1999

(30) Foreign Application Priority Data

Jun. 19, 1998 (JP) ............................................. 10-172365

(51) Int. Cl.[7] ............................................... G06F 15/16
(52) U.S. Cl. ........................ 709/250; 709/230; 370/463
(58) Field of Search ................................ 709/203, 200, 709/250, 230, 231; 710/1, 300, 305; 370/463, 351, 400, 402; 358/425

(56) References Cited

U.S. PATENT DOCUMENTS

| | | | | |
|---|---|---|---|---|
| 4,628,505 A | * | 12/1986 | Paris .......................... | 370/363 |
| 4,967,288 A | * | 10/1990 | Mizutori et al. ............. | 358/425 |
| 5,530,904 A | * | 6/1996 | Koga .......................... | 395/872 |
| 5,621,731 A | * | 4/1997 | Dale et al. .................. | 370/257 |
| 5,649,005 A | * | 7/1997 | Lynch et al. ................ | 379/242 |
| 5,802,278 A | * | 9/1998 | Isfeld et al. ................ | 709/249 |
| 5,875,234 A | * | 2/1999 | Clayton et al. .......... | 379/93.05 |
| 6,009,088 A | * | 12/1999 | Taguchi et al. ............. | 370/338 |
| 6,131,133 A | * | 10/2000 | Salbaum et al. .............. | 710/48 |
| 6,141,338 A | * | 10/2000 | Tadamura et al. .......... | 370/352 |
| 6,215,770 B1 | * | 4/2001 | Orlamunder et al. ....... | 370/230 |
| 6,266,701 B1 | * | 7/2001 | Sridhar et al. .............. | 709/232 |

FOREIGN PATENT DOCUMENTS

| | | |
|---|---|---|
| JP | 1-144833 | 6/1989 |
| JP | 8-182057 | 7/1996 |

* cited by examiner

*Primary Examiner*—Frantz B. Jean
(74) *Attorney, Agent, or Firm*—Katten Muchin Zavis Rosenman

(57) ABSTRACT

A dual-port memory is provided between an internal bus of a control unit of an exchange and a general-purpose bus such as an ISA bus or a PCI bus. A LAN controller for connecting to a LAN and a processor controller for controlling the LAN controller are connected to the general-purpose bus. In a configuration where a plurality of application processors are connected to the LAN, software for implementing a server function for enabling the application processors to be clients and a gateway function for connecting the LAN to the internal bus of the exchange is downloaded into the processor controller. In a configuration where a centralized management console is connected to the LAN, software for implementing an SNMP agent function is downloaded into the processor controller.

6 Claims, 10 Drawing Sheets

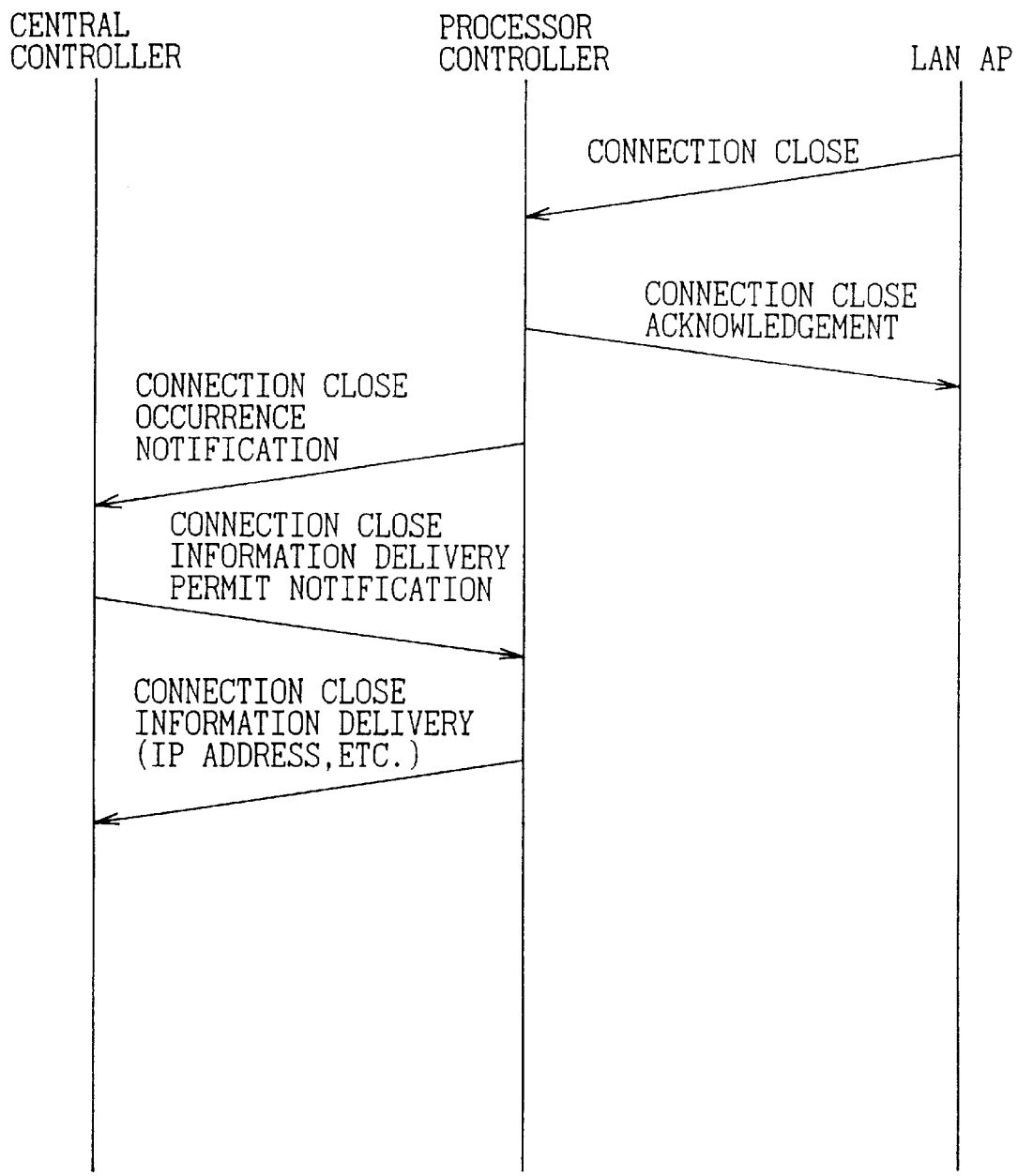

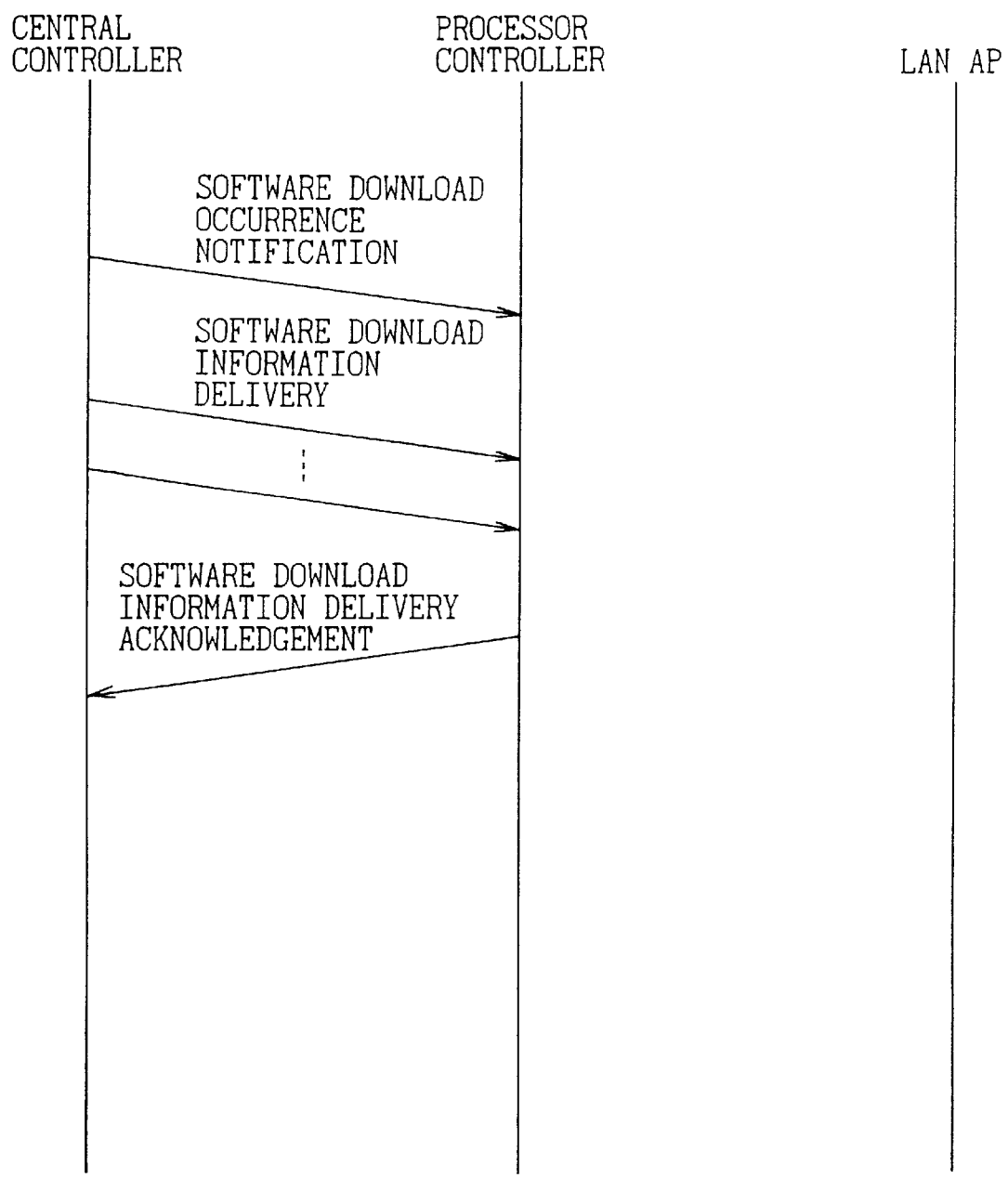

EXCHANGE CONNECTABLE TO LAN

BACKGROUND OF THE INVENTION

1. Field of the Invention

The present invention relates to an exchange connectable to a local area network (LAN).

2. Description of the Related Art

When connecting various application processors to a control unit of an exchange, or when connecting a remotely located centralized management unit to it, a LAN is connected to the control unit via a gateway, an agent console, or the like. The connection with the gateway or agent console is made via a data communication controller connected to an internal bus of the control unit.

In this case, the connection between the data communication controller and the gateway or agent console is set up through an RS-232C interface using a HDLC (High-Level Data Link Control) protocol. Since its transmission rate is 9600 bps, if the amount of data to be transmitted is large, there arises the problem that the transmission time increases.

One way to address this problem would be by connecting a LAN controller to the internal bus of the control unit of the exchange to enable the control unit to be connected directly to the LAN.

However, existing control software for exchange control units does not support the connection of LAN controllers; therefore, if the LAN is to be connected directly to the exchange, a control program specifically designed for the purpose has to be developed from scratch. In that case, an enormous amount of effort would have to be expended.to develop the program, presenting a problem in terms of the time and cost required for the development of the program.

SUMMARY OF THE INVENTION

An object of the present invention is to enable a control unit of an exchange to be economically connected to a LAN.

According to the present invention, there is provided an exchange connectable to a LAN (local area network), comprising: a processor-to-processor data communication controller connected to an internal bus of a control unit of the exchange; a general-purpose bus connected to the processor-to-processor data communication controller; a LAN controller, connected to the general-purpose bus, for enabling a connection to be made with the LAN; and a processor controller, connected to the general-purpose bus, for controlling the LAN controller.

BRIEF DESCRIPTION OF THE DRAWING

A more complete understanding of the invention may be obtained by reading the following description of specific illustrative embodiments of the invention in conjunction with the appended drawing in which:

FIG. 9 presents a flow diagram illustrating a connection release process for an embodiment of the present invention; and FIG. 10 presents a flow diagram illustrating a software download process for an embodiment of the present invention.

DESCRIPTION OF THE PREFERRED EMBODIMENTS

Figure 1:
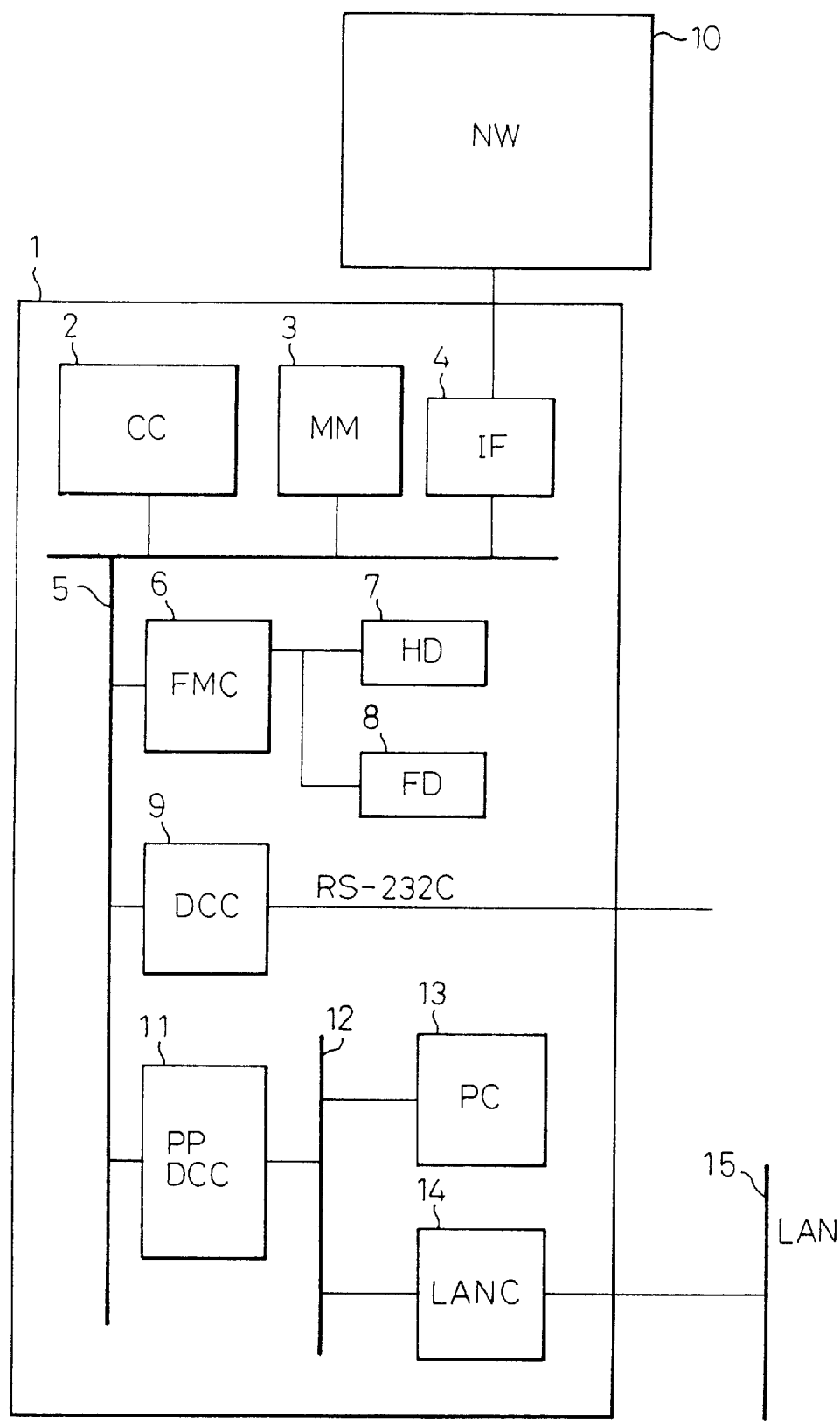
FIG. 1 presents a block diagram illustrating a portion of an embodiment of the inventive exchange.

FIG. 1 is a diagram for explaining an essential portion of an embodiment of the present invention, wherein reference numeral 1 is a control unit, 2 is a central controller (CC), 3 is a main memory (MM), 4 is an interface (IF), 5 is an internal bus, 6 is a file memory controller (FMC), 7 is a hard disk drive (HD), 8 is a floppy disk drive (FD), 9 is a data communication controller (DCC), 10 is a network (NW), 11 is processor-to-processor data communication controller (PPDCC), 12 is a general-purpose bus such as an ISA (Industry Standard Architecture) bus or a PCI (Peripheral Component Interconnect) bus, 13 is a processor controller (PC), 14 is a LAN controller (LANC), and 15 is a local area network (LAN).

The control unit 1 controls the network 10 in accordance with call control information, and performs processing to exchange voice data, video data, etc. between subscriber terminals including telephones. The central controller 2 in the control unit 1 is connected to the main memory 3, the data communication controller 9, etc. via the internal bus 5 called a PCB bus, and controls the network 10 via the interface 4. The hard disk drive 7 and floppy disk drive 8 are connected so that they can be accessed via the file memory controller 6.

In this embodiment, the control unit 1 contains the processor-to-processor data communication controller 11, general-purpose bus 12, processor controller 13, and LAN controller 14, and the external LAN 15 is connected to the LAN controller 14.

The processor-to-processor data communication controller 11 can be implemented using relatively simple circuitry for performing data transfer between the internal bus 5 and the general-purpose bus 12, and can, for example, be constructed from.a dual-port memory. The processor controller 13 and LAN controller 14 are connected to the general-purpose bus 12, and the external LAN 15 is connected to the LAN controller 14. An application processor or a centralized management unit is connected to this LAN 15.

When connecting an application processor to the LAN 15, programs for implementing a gateway function and a server function are stored in the processor controller 13 and, when connecting a centralized management unit, an SNMP (Simple Network Management Protocol) agent function, for example, is provided.

The general-purpose bus 12 is interposed between the external LAN 15 and the internal bus 5, and the processor-to-processor data communication controller 11 is provided between the general-purpose bus 12 and the internal bus 5.

Data from the LAN 15 is written, under the control of the processor controller 13, to a memory in the processor-to-processor data communication controller 11 via the LAN controller 14 and the general-purpose bus 12. By reading the data from the memory in the processor-to-processor data communication controller 11 under the control of the central controller 2, the data transmitted from the application processor or centralized management unit connected via the LAN 15 can be received for processing. When transmitting data in the opposite direction to that described above, the data is written to the memory in the processor-to-processor data communication controller 11 via the internal bus 5, and then the data is read out under the control of the processor controller 13 and transmitted out onto the external LAN 15 via the LAN controller 14.

Control programs are already developed for the general-purpose bus 12 such as an ISA bus or a PCI bus, and a general-purpose bus achieving a transmission rate of several tens of megabits or 100 megabits per second can be employed. Accordingly, even when a plurality of application processors are connected to the LAN 15, data can be transmitted to and from each application processor at high speed with the data transmission rates supported by the internal bus 5, the general-purpose bus 12, and the LAN 15. Also, when a centralized management unit is connected via the LAN 15 or the like, large volumes of data including trouble information, state information, etc. can be collected in a short period of time.

If the general-purpose bus 12 is provided for connecting the high-speed external LAN 15, since the control program for the general-purpose bus 12 is already developed, there is no need to develop a new control program from scratch. Further, by equipping the processor controller 13 with a gateway function, server function, and agent function, the need to provide a gateway, agent console, or the like for connecting the LAN 15 can be eliminated, and an economical configuration can thus be achieved.

Figure 2:
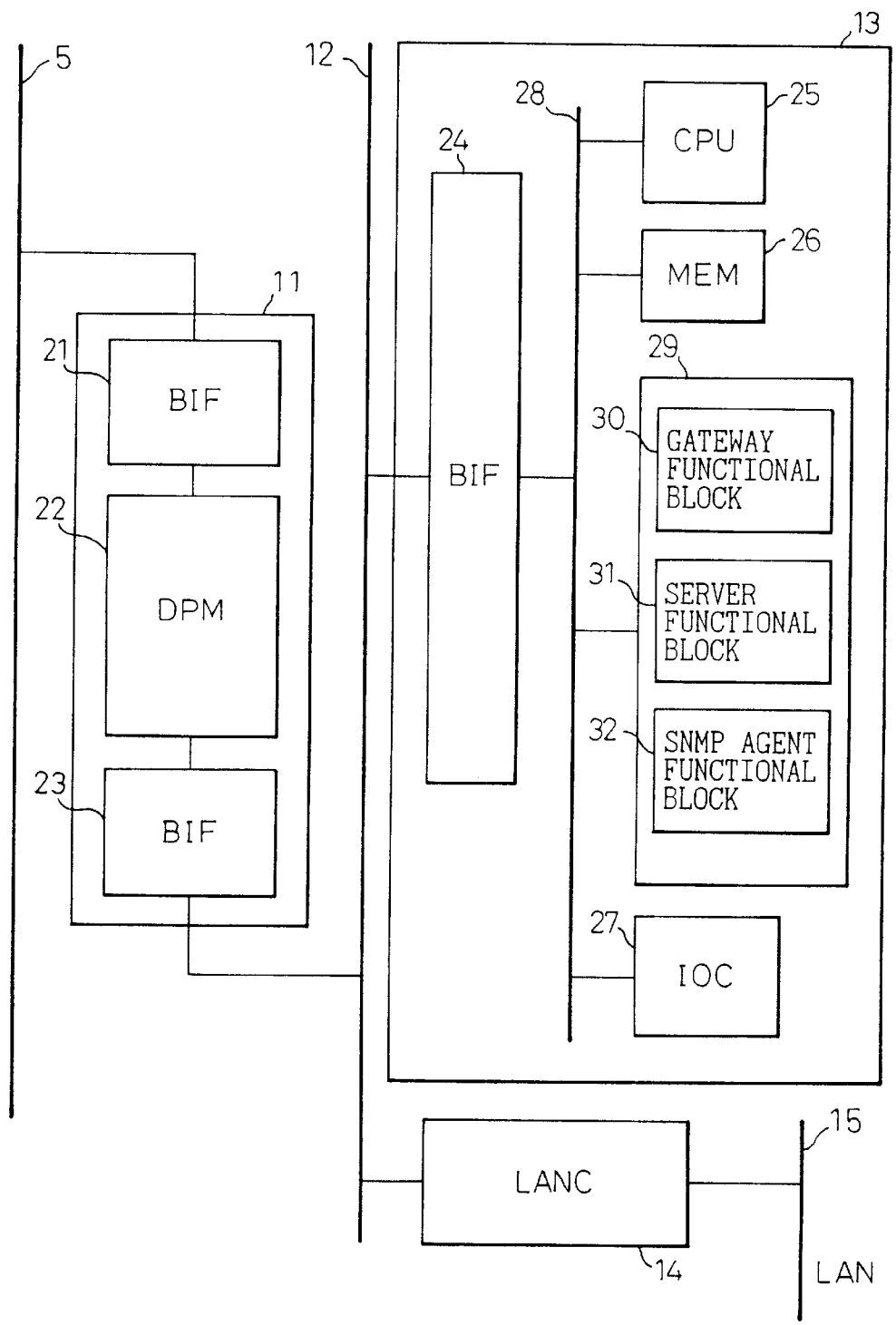
FIG. 2 presents a block diagram providing greater detail to the diagram of FIG. 1.

FIG. 2 is a diagram for explaining the essential portion of the embodiment of the present invention, providing a detail illustration of the processor-to-processor data communication controller 11 and processor controller 13 shown in FIG. 1. Reference numeral 21 is an internal bus interface (BIF), 22 is a dual-port memory (DPM), 23 is a general-purpose bus interface (BIF), 24 is a general-purpose bus interface (BIF), 25 is a processor (CPU), 26 is a memory (MEM), 27 is an input/output controller (IOC), 28 is an internal bus, 29 is a memory for storing programs implementing the various functions, 30 is a gateway functional block, 31 is a server functional block, and 32 is an SNMP agent functional block.

The processor controller 13 contains the processor 25 and the memories 26 and 29. The processor 25 controls each unit so that corresponding functions are implemented in accordance with the programs of the gateway functional block 30, server functional block 31, and SNMP agent functional block 32 in the memory 29. The memory 29 can be constructed from a random-access memory (RAM) or a programmable read-only memory (PROM); for example, an electrically erasable writable flash memory can be used.

The processor-to-processor data communication controller 11 contains the internal bus interface 21, general-purpose bus interface 23, and dual-port memory 22. Data transferred from the LAN 15 via the LAN controller 14 is written to the dual-port memory 22 via the general-purpose bus 12 under the control of the processor controller 13. Conversely, data is written to the dual-port memory 22 via the internal bus 5 under the control of the central controller 2.

A flag (not shown), which is set when data is stored, is provided in the dual-port memory 22; the central controller 2 periodically reads this flag via the internal bus 5 and, when the flag is set, determines that data has been written to the dual-port memory 22 and either reads the data via the internal bus 5 or transfers the data via the internal bus 5 to the main memory 3 by DMA (Direct Memory Access). Upon completion of the data read, the flag is reset. Similarly, data written under the control of the central controller 2 is read from the dual-port memory 22 under the control of the processor controller 13, and transmitted out on the LAN 15 via the general-purpose bus 12 and the LAN controller 14.

Figure 3:
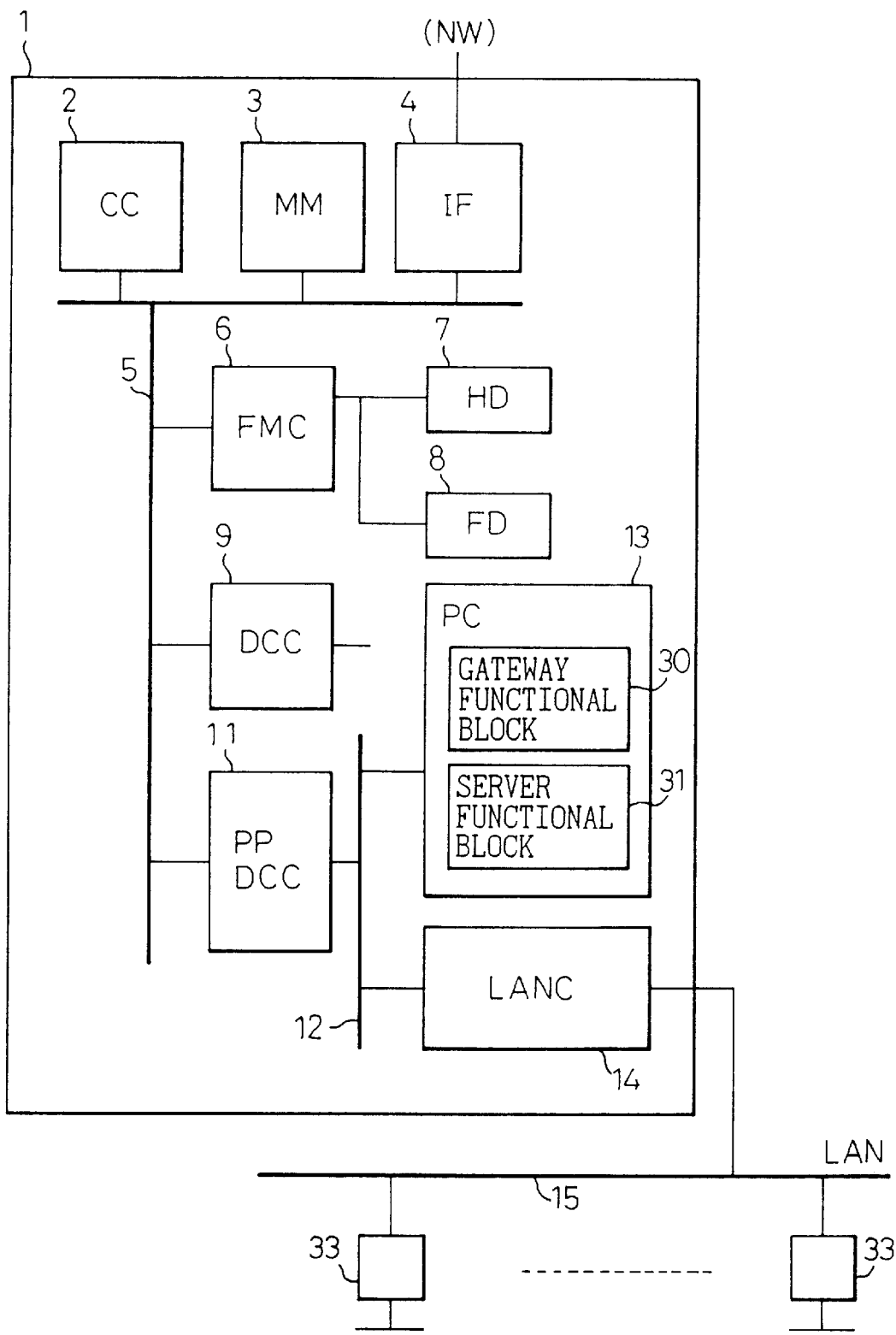
FIG. 3 presents a block diagram illustrating a configuration of the present invention in which a plurality of application processors together with the inventive exchange to a local area network (LAN)

FIG. 3 shows a configuration where a plurality of application processors are connected to the LAN. In the figure, the same parts as those in FIGS. 1 and 2 are designated by the same reference numerals, the application processors being generally indicated by reference numeral 33. The plurality of application processors 33 are connected to the LAN 15 external to the exchange, and the LAN 15 is connected to the general-purpose bus 12 via the LAN controller (LANC) 14 in the control unit 1, as previously described.

The processor controller (PC) 13 contains the gateway functional block 30 and server functional block 31. More specifically, programs for implementing the gateway function and the server function which enable the application processors to be clients are stored in the memory 29 (FIG. 2) contained in the processor controller 13. This enables the LAN 15 to be connected to the general-purpose bus 12 via the LAN controller (LANC) 14 without connecting a gateway between them. Accordingly, even when a large number of application processors 33 are connected to the LAN 15, data can be transmitted at high speed using a known general-purpose bus capable of a transmission rate of, for example, 100 Mbps.

Figure 4:
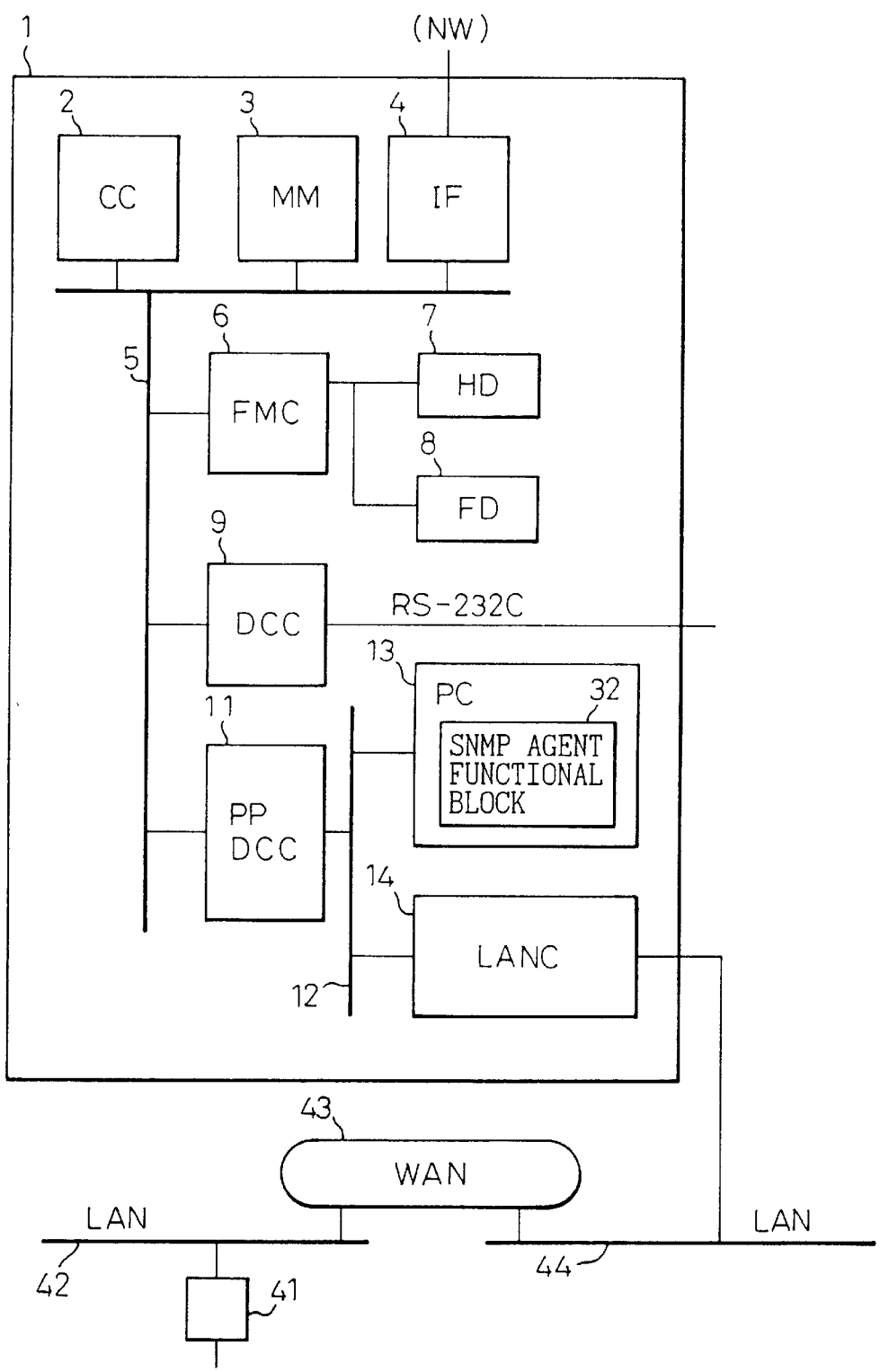
FIG. 4 presents a block diagram illustrating a second configuration connecting a centralized remote management console to the LAN via a second LAN and a wide area network (WAN)

FIG. 4 shows a configuration where a remotely located centralized management unit is connected to the LAN via a WAN (Wide Area Network). In the figure, the same parts as those in FIGS. 1 and 2 are designated by the same reference numerals, while reference numeral 41 indicates the centralized management console (centralized management unit), 42 and 44 LANs, and 43 the WAN. The remotely located centralized management console 41 is connected to the control unit 1 of the exchange via the LAN 42, WAN 43, and LAN 44, and data such as trouble information and state information concerning the designated exchange are collected at the centralized management console 41.

In this configuration, the processor controller (PC) 13 contains the SNMP agent functional block 32. More specifically, a program for implementing the SNMP agent function is stored in the memory 29 (FIG. 2) contained in the processor controller 13. Accordingly, the centralized management console 41 can be connected via the LANs 42 and 44, etc. without the need for an agent console. As earlier described, a general-purpose bus with a transmission rate of 100 Mbps is known; therefore, by using such a known general-purpose bus 12, it becomes possible to transmit large volumes of data to and from the centralized management console 41 in a short period of time. The Internet or an intranet can be used as the WAN 43.

The centralized management console 41 issues a GET command to a designated exchange selected from among a plurality of exchanges, requesting the transmission of trouble information, state information, etc. concerning that exchange. In response to this command, the processor controller 13 having the SNMP agent functional block 32 returns GET RESPONSE, thereby transmitting the trouble information and state information concerning the exchange to the centralized management console 41 via the LAN 44, WAN 43, and LAN 42. In this way, the centralized management console 41 can collect the trouble information and state information from the designated exchange.

Figure 5:
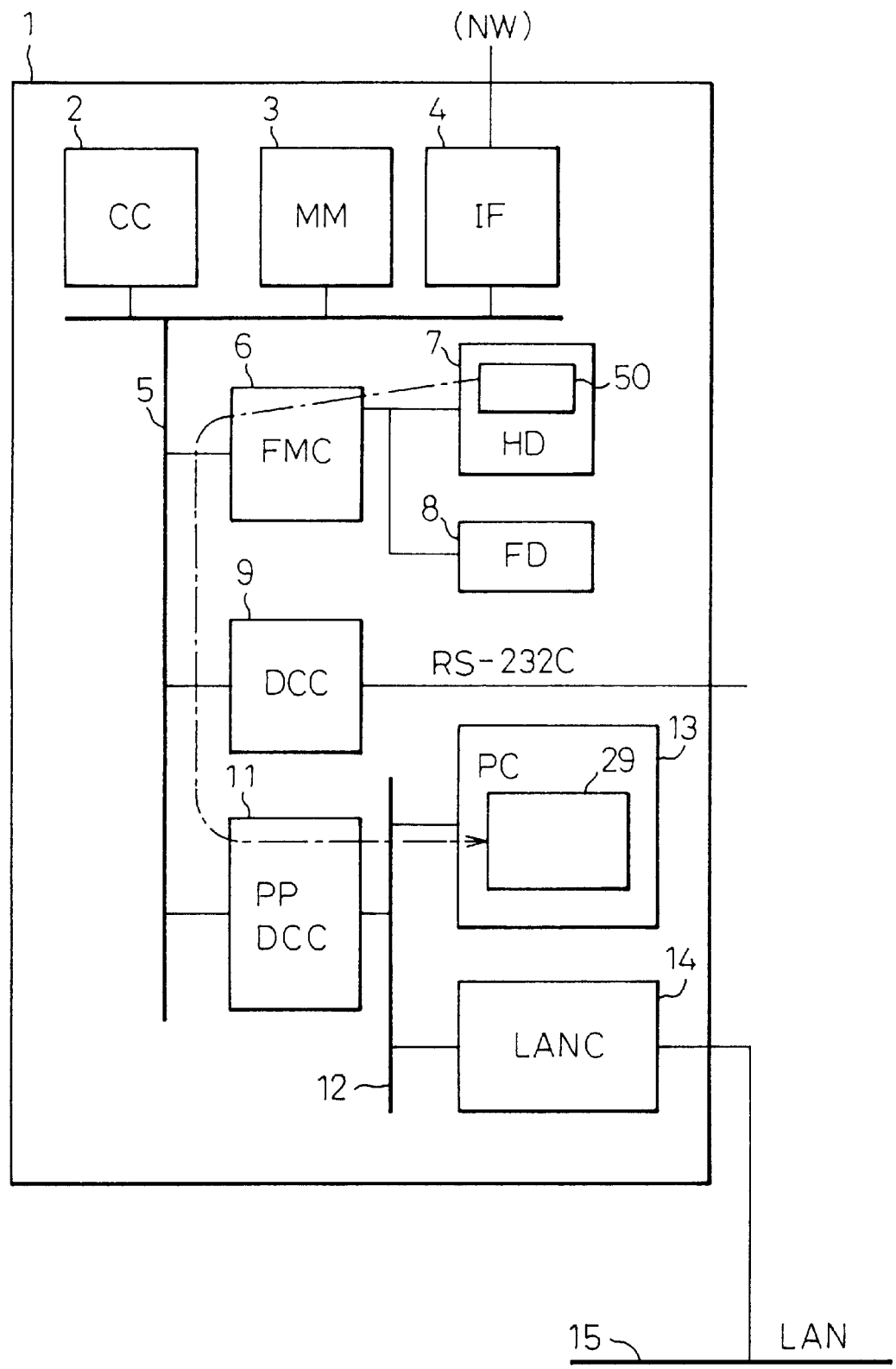
FIG. 5 presents a block diagram showing how a hard disk drive in the inventive exchange of FIG. 3 downloads programs to a processor controller in the inventive exchange.

FIG. 5 is a diagram for explaining how programs are downloaded into the processor controller 13 from the hard disk drive 7. In the figure, the same parts as those in FIGS. 1 and 2 are designated by the same reference numerals. When programs 50 for the gateway function, server function, SNMP agent function, etc. are stored in advance in the hard disk drive 7, the central controller (CC) 2 has the programs 50 downloaded at system power-up into the memory 29 in the processor controller (PC) 13 by DMA transfer through the channel indicated by a semi-dashed line.

In a configuration where an application processor is connected to the control unit 1, the programs for the gateway function and the server function are selected for downloading as the programs 50, and in a configuration where a centralized management console is connected, the program for the SNMP agent function is selected for downloading. Alternatively, the programs for all the functions may be downloaded into the memory 29 in the processor controller 13.

For a version upgrade or the like, a floppy disk holding a program for the version upgrade, for example, is inserted into the floppy disk drive 8, and the program is transferred from the floppy disk to the hard disk drive 7 under the control of the file memory controller 8 in accordance with an instruction from the central controller 2, and then downloaded as a program 50 from the hard disk drive 7 in the same manner as described above. The program can be downloaded directly from the floppy disk drive 8, but in view of the data read speed, data volume, etc., it is usual to first write the program to the hard disk drive 7 and then download it from the hard disk drive 7, as described above.

Figure 6:
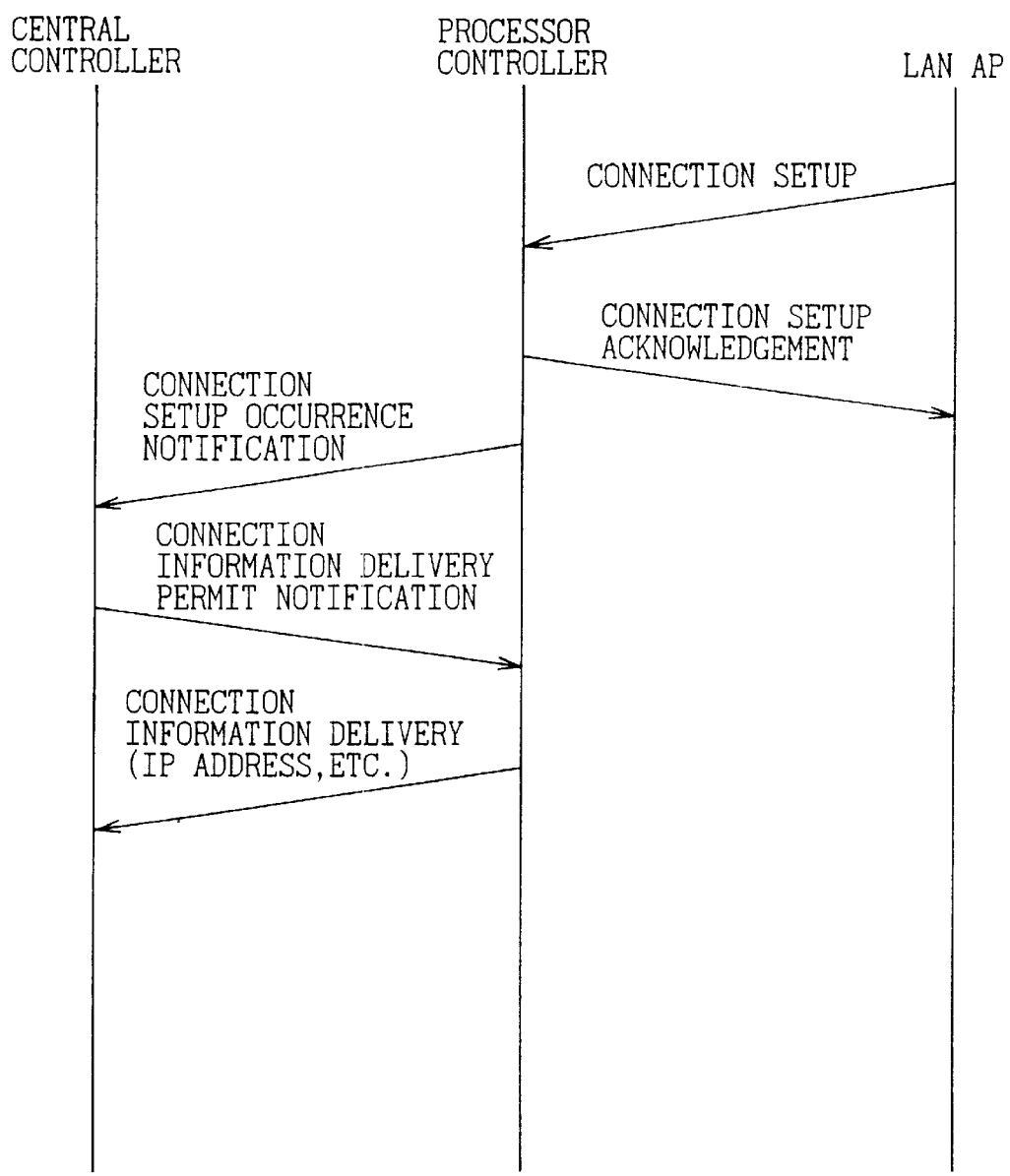
FIG. 6 presents a flow diagram illustrating a connection setup process for an embodiment of the present invention.

FIG. 6 is a diagram for explaining a connection setup process sequence as an embodiment of the present invention, illustrating, for example, the processing at the central controller (CC) 2, the processor controller (PC) 13, and an AP (application processor) 33 on the LAN shown in FIG. 3. First, when the LAN AP sends out a connection setup request including an IP address, the request is routed via the LAN 15, LAN controller 14, and general-purpose bus 12 and delivered to the processor controller 13. Upon receipt of this connection setup request, the processor controller 13 returns a connection setup acknowledgement to the LAN AP and, at the same time, sends a connection setup occurrence notification to the central controller 2 via the general-purpose bus 12, processor-to-processor data communication controller 11, and internal bus 5.

In response to the connection setup occurrence notification, the central controller 2 returns a connection information delivery permit notification to the processor controller 13. In accordance with this permit notification, the processor controller 13 delivers the connection information, including the IP address, to the central controller 2. In this way, the connection between the LAN AP and the control unit 1 is set up. In a configuration where a centralized management console is connected via the LAN 15, the connection can be established in like manner in accordance with a connection setup request from the centralized management console.

Figure 7:
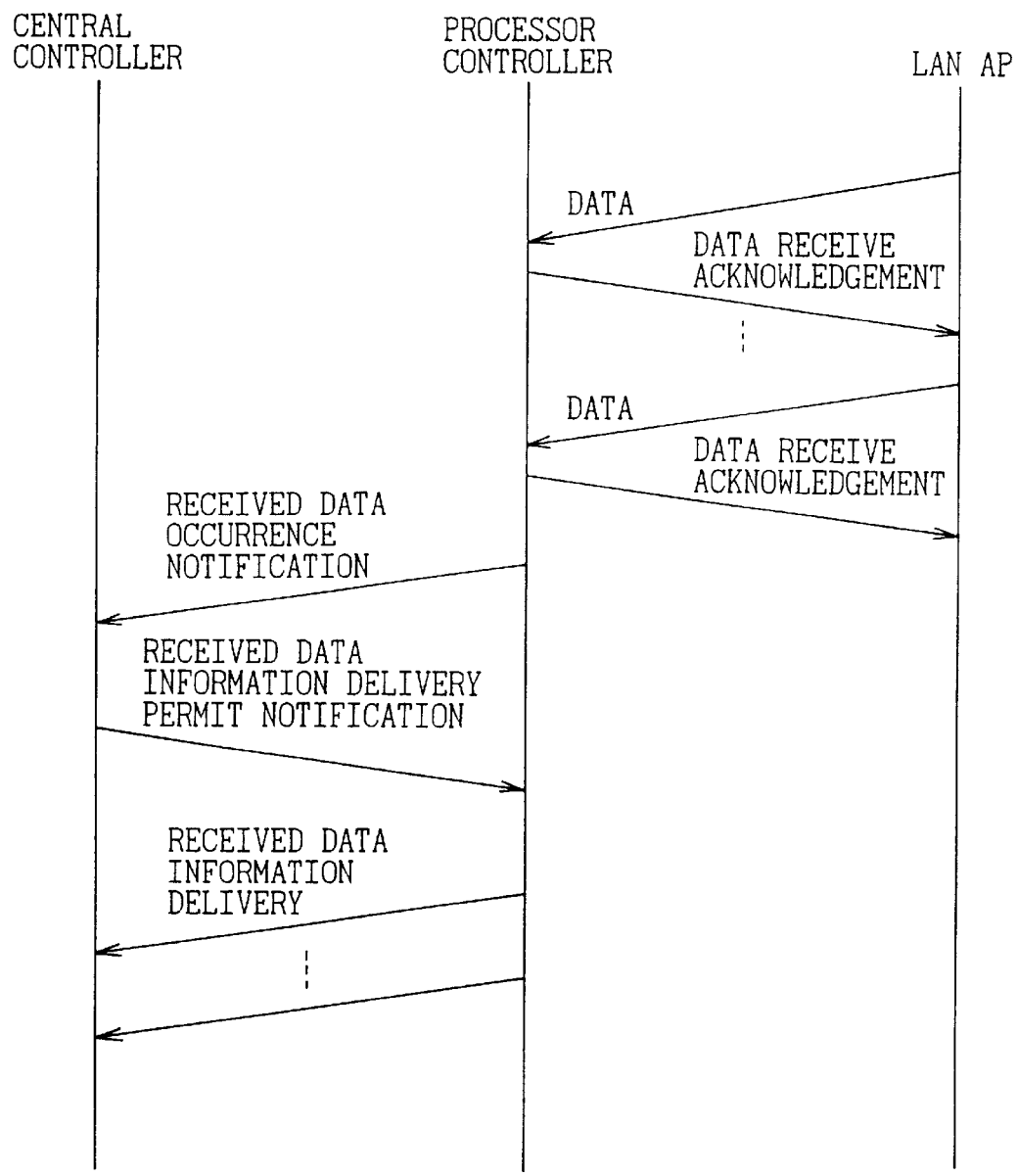
FIG. 7 presents a flow diagram illustrating a message receive process for an embodiment of the present invention.

FIG. 7 is a diagram for explaining a message receive process sequence as an embodiment of the present invention, illustrating an outline of the process sequence when sending data from the LAN AP to the central controller 2 after establishing the connection as described above. If the data volume of the message to be transmitted is large, for example, the message is divided into smaller units of data; in that case, the LAN AP sends out the data one unit at a time.

Upon receiving each unit of data, the processor controller 13 sends a data receive acknowledgement to the LAN AP. When this data receive acknowledgement is received, the LAN AP sends out the next unit of data. The processor controller 13 then returns a data receive acknowledgement for this unit of data to the LAN AP. By repeating this process, the LAN AP transmits the data to the control unit 1 of the exchange. Alternatively, control may be performed so that a prescribed number of data units are sent out in succession and a data receive acknowledgement for these data units is returned to initiate the transmission of the next succession of data units.

Next, the processor controller 13 sends a received data occurrence notification to the central controller 2. In response to the received data occurrence notification, the central controller 2 returns a received data information delivery permit notification, in accordance with which the processor controller 13 delivers the received data information. That is, the data received from the LAN AP is delivered to the central controller 2.

Figure 8:
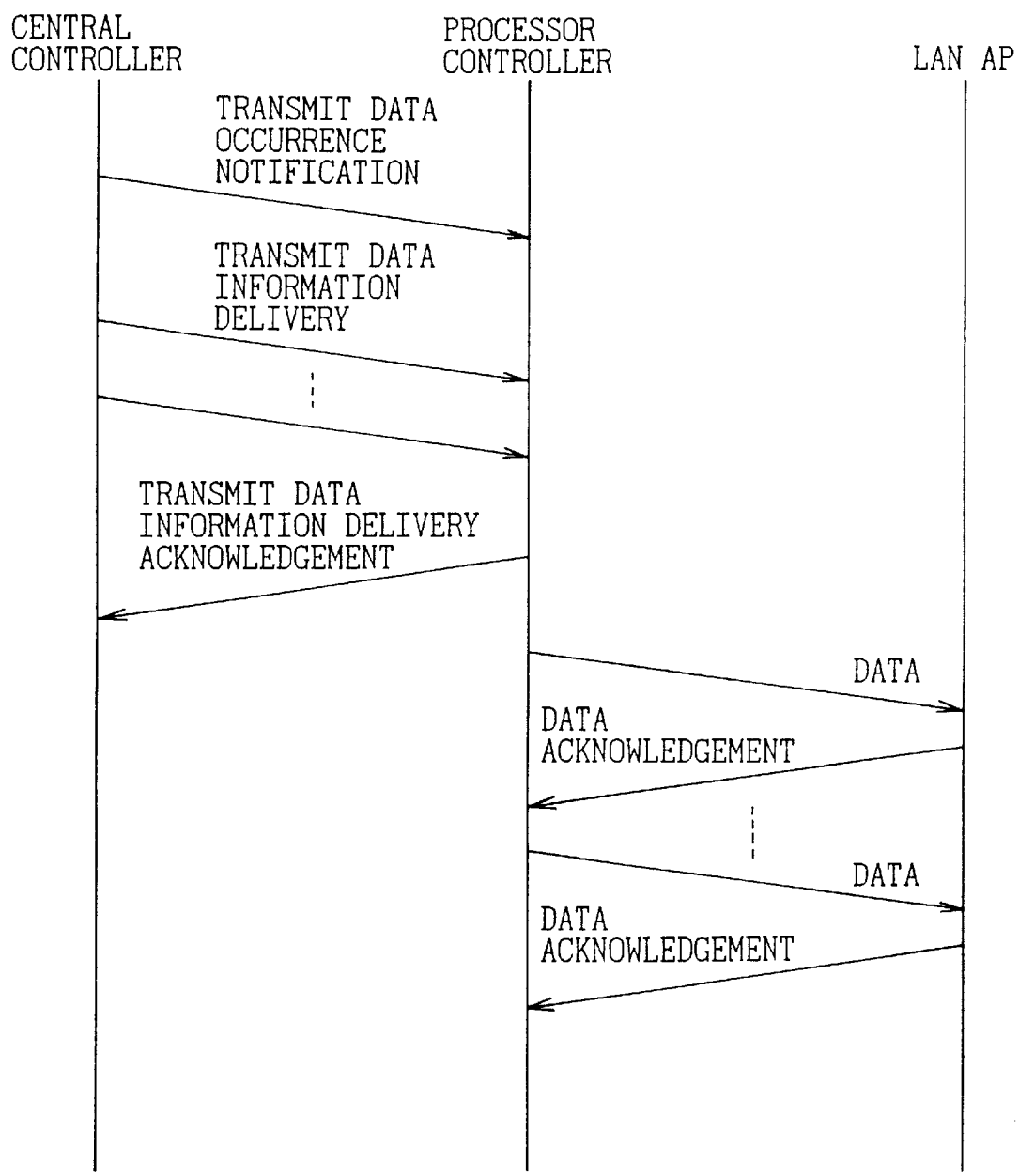
FIG. 8 presents a flow diagram illustrating a message transmit process for an embodiment of the present invention.

FIG. 8 is a diagram for explaining a message transmit process sequence as an embodiment of the present invention, illustrating an outline of the process sequence when sending data from the central controller 2 to the LAN AP. If the data volume of the message to be transmitted is large, for example, the message is divided into smaller units of data, as in the above process. In that case, the central controller 2 sends a transmit data occurrence notification to the processor controller 13, followed by the delivery of transmit data information, i.e., the data to be transmitted to the LAN AP. Upon receiving the data constituting the message, the processor controller 13 sends a transmit data information delivery acknowledgement.

Then, the processor controller 13 initiates data transmission to the LAN AP and, when an acknowledgement for the transmitted data is received from the LAN AP, transmits the next unit of data. By repeating this process, the data from the central controller 2 is transmitted to the LAN AP.

In the above processes, data is transferred between the LAN AP and the central controller 2 via the LAN 15, LAN controller 14, general-purpose bus 12, processor-to-processor data communication controller 11, and internal bus 5. More specifically, data received from the LAN AP is first written to the dual-port memory 22 in the processor-to-processor data communication controller 11 under the control of the LAN controller 14 and processor controller 13. In this case, since the general-purpose bus 12 is capable of high-speed data transmission, the data from the LAN AP can be transferred at high speed. Then, a flag is set as previously described; this is equivalent to sending the received data occurrence notification from the processor controller 13 to the central controller 2 as shown in FIG. 7.

The central controller 2 periodically checks this flag and, when the flag is set, recognizes that data is stored in the dual-port memory 22; thereupon, the central controller 2 activates the DMA function to have the data transferred from the dual-port memory 22 to the main memory 3. This processing is equivalent to delivering the received data information from the processor controller 13 to the central controller 2 as shown in FIG. 7. In this case also, the data can be transferred at the data transmission rate supported by the internal bus 5.

Likewise, when transmitting data from the central controller 2 to the LAN AP, the central controller 2 first activates the DMA function to have the data transferred from the main memory 3 to the dual-port memory 22 in the processor-to-processor data communication controller 11. This processing is equivalent to delivering the transmit data information from the central controller 2 to the processor controller 13.

The processor controller 13 monitors the presence or absence of data stored in the dual-port memory 22 in the processor-to-processor data communication controller 11; when it recognizes that the data has been written under the control of the central controller 2, the processor controller 13 reads out the data and transmits it to the LAN AP via the general-purpose bus 12 and LAN 15. This processing is equivalent to transmitting data from the processor controller 13 to the LAN AP as shown in FIG. 8. In this case also, the data can be transmitted to the LAN AP at high speed in accordance with the data transmission rate supported by the general-purpose bus 12.

FIG. 9 is a diagram for explaining a connection release process sequence as an embodiment of the present invention, wherein in response to a connection close request from the LAN AP, the processor controller 13 sends a connection close acknowledgement to the LAN AP and a connection close occurrence notification to the central controller 2. In response to the connection close occurrence notification, the central controller 2 returns a connection close information delivery permit notification. In response, the processor controller 13 delivers connection close information, including the IP address, to the central controller 2.

FIG. 10 is a diagram for explaining a software download process sequence as an embodiment of the present invention, illustrating an outline of the process sequence in which programs for implementing various functions are downloaded from the hard disk drive 7, etc. into the memory 29 in the processor controller 13 under the control of the central controller 2.

In this case also, the transfer of signals between the central controller 2 and the processor controller 13 is performed via the processor-to-processor data communication controller 11 when downloading the programs. At system power-up or when upgrading the version, the central controller 2 sends a software download occurrence notification to the processor controller 13. The central controller 2 then delivers software download information, in response to which the processor controller 13 returns a software download information delivery acknowledgement to the central controller 2.

More specifically, the DMA function is activated under the control of the central controller 2, and the program data from the hard disk drive 7, etc. is transferred via the internal bus 5 and written to the dual-port memory 22 in the processor-to-processor data communication controller 11; the processor controller 13 then reads the data from the dual-port memory 22 and writes it to the memory 29 via the general-purpose bus 12. In this way, the programs for the various functions can be downloaded into the memory 29 in the processor controller 13.

What is claimed is:

1. An exchange connectable to a LAN (local area network), comprising:
    a processor-to-processor data communication controller connected to an internal bus of a control unit of said exchange;
    a general-purpose bus directly connected to said processor-to-processor data communication controller;
    a LAN controller, directly connected to said general-purpose bus, for enabling a connection to be made with said LAN; and
    a processor controller, directly connected to said general purpose bus, for controlling said LAN controller.

2. An exchange according to claim 1, wherein said processor-to-processor data communication controller includes a dual-port memory capable of data read and write from both said internal bus and said general-purpose bus.

3. An exchange connectable to a LAN (local area network), comprising:
    a processor-to-processor data communication controller connected to an internal bus of a control unit of said exchange;
    a general-purpose bus connected to said processor-to-processor data communication controller;
    a LAN controller, connected to said general-purpose bus, for enabling a connection to be made with said LAN; and
    a processor controller, connected to said general purpose bus, for controlling said LAN controller;
    wherein said processor controller has a server function for enabling a plurality of application processors connected to said LAN to be clients, and a gateway function for connecting said LAN to said internal bus of said control unit of said exchange.

4. An exchange according to claim 3, wherein software for implementing said server function and said gateway function is downloaded from said control unit of said exchange via said processor-to-processor data communication controller.

5. An exchange connectable to a LAN (local area network), comprising:
    a processor-to-processor data communication controller connected to an internal bus of a control unit of said exchange;
    a general-purpose bus connected to said processor-to-processor data communication controller;
    a LAN controller, connected to said general-purpose bus, for enabling a connection to be made with said LAN; and
    a processor controller, connected to said general purpose bus, for controlling said LAN controller;
    wherein said processor controller has an agent function for sending information concerning said exchange to a centralized management console connected to said LAN.

6. An exchange according to claim 5, wherein software for implementing said agent function is downloaded from said control unit of said exchange via said processor-to-processor data communication controller.

* * * * *